United States Patent
Podlesny

(10) Patent No.: US 9,066,473 B2
(45) Date of Patent: Jun. 30, 2015

(54) DUAL MODE RATCHET PRUNERS

(75) Inventor: Walter Podlesny, Mount Martha (AU)

(73) Assignee: 2WP Internation Pty Ltd., Rowville (AU)

( * ) Notice: Subject to any disclaimer, the term of this patent is extended or adjusted under 35 U.S.C. 154(b) by 184 days.

(21) Appl. No.: 13/884,662

(22) PCT Filed: Nov. 14, 2011

(86) PCT No.: PCT/AU2011/001466
§ 371 (c)(1),
(2), (4) Date: Jun. 21, 2013

(87) PCT Pub. No.: WO2012/061903
PCT Pub. Date: May 18, 2012

(65) Prior Publication Data
US 2014/0041236 A1    Feb. 13, 2014

(30) Foreign Application Priority Data
Nov. 12, 2010 (AU) ................................. 2010101247

(51) Int. Cl.
*A01G 3/02* (2006.01)

(52) U.S. Cl.
CPC . *A01G 3/021* (2013.01); *A01G 3/02* (2013.01)

(58) Field of Classification Search
CPC ................... A01G 3/02; A01G 3/021; B26B 17/00–17/02
USPC ........... 30/188, 190, 250, 251, 266, 340, 341, 30/189; 81/60–62, 63.1, 63.2, 318, 384; D8/5, 57
See application file for complete search history.

(56) References Cited

U.S. PATENT DOCUMENTS

| | | | | |
|---|---|---|---|---|
| 1,820,169 A | * | 8/1931 | Wigand | 30/190 |
| 3,273,240 A | | 9/1966 | Florian | |
| 3,390,455 A | * | 7/1968 | Florian | 30/251 |
| 3,851,389 A | * | 12/1974 | Swanson | 30/250 |
| 4,176,450 A | * | 12/1979 | Muromoto | 30/251 |
| 4,186,484 A | * | 2/1980 | Tanaka | 30/251 |
| RE30,613 E | * | 5/1981 | Nakamura et al. | 30/251 |
| 4,312,127 A | * | 1/1982 | Tanaka | 30/250 |
| 4,368,577 A | * | 1/1983 | Babb | 30/251 |
| 5,511,314 A | * | 4/1996 | Huang | 30/251 |
| 5,718,051 A | * | 2/1998 | Huang | 30/250 |
| 5,761,815 A | * | 6/1998 | Lin | 30/251 |

(Continued)

FOREIGN PATENT DOCUMENTS

CA          2760640 A1 * 11/2010
DE    10 2007 031 145 A1    1/2009

(Continued)

OTHER PUBLICATIONS

PCT International Search Report for PCT/AU2011/001466 mailed Feb. 20, 2012 (2 pages).

*Primary Examiner* — Jason Daniel Prone
(74) *Attorney, Agent, or Firm* — Sutherland Asbill & Brennan LLP

(57) ABSTRACT

Pruners and Toppers have dual mode operation in that the blade is closed with a single squeeze or with multiple squeezes and a rotatable selector selects the desired mode. The blade has a rocker arm with ratchet teeth formed in a window in the arm. The scissor handle has a radius arm which ends in a pawl which can engage the ratchet nearer the pivot axis of the blade or further from it.

14 Claims, 3 Drawing Sheets

(56) References Cited

U.S. PATENT DOCUMENTS

| | | | |
|---|---|---|---|
| 5,950,314 A * | 9/1999 | Chang | 30/250 |
| D434,285 S * | 11/2000 | Podlesny | D8/5 |
| 6,640,442 B2 * | 11/2003 | Lin | 30/251 |
| 6,766,581 B2 * | 7/2004 | Nordlin | 30/251 |
| 7,127,819 B1 * | 10/2006 | Huang | 30/251 |
| 7,454,837 B2 * | 11/2008 | Shan | 30/251 |
| 7,596,870 B2 * | 10/2009 | Klecker et al. | 30/236 |
| 7,743,509 B2 * | 6/2010 | Macsay et al. | 30/251 |
| 7,946,039 B2 * | 5/2011 | Erbrick | 30/251 |
| 7,966,681 B2 * | 6/2011 | Harris | 30/251 |
| 8,024,864 B2 * | 9/2011 | Mortensen | 30/250 |
| 8,266,804 B2 * | 9/2012 | Huang | 30/190 |
| 8,458,912 B2 * | 6/2013 | Linden et al. | 30/251 |
| 8,578,614 B2 * | 11/2013 | Hernandez | 30/251 |
| 8,732,960 B2 | 5/2014 | Wang | |
| 8,813,370 B2 * | 8/2014 | Pellenc | 30/249 |
| 2007/0044317 A1 * | 3/2007 | Critelli | 30/173 |
| 2007/0079512 A1 * | 4/2007 | Nelson et al. | 30/123.3 |
| 2010/0043237 A1 * | 2/2010 | Linden et al. | 30/250 |
| 2011/0283545 A1 * | 11/2011 | Wu | 30/250 |
| 2012/0047750 A1 | 3/2012 | Maag et al. | |
| 2013/0008563 A1 * | 1/2013 | Reh | 144/24.13 |

FOREIGN PATENT DOCUMENTS

| | | | |
|---|---|---|---|
| DE | 102009019989 A1 * | 11/2010 | |
| WO | 2010/127814 A1 | 11/2010 | |
| WO | WO 2011116790 A1 * | 9/2011 | |
| WO | WO 2012061903 A1 * | 5/2012 | |

* cited by examiner

DUAL MODE RATCHET PRUNERS

CROSS-REFERENCE TO RELATED APPLICATIONS

This application is the national stage of International Application No. PCT/AU2011/001466, filed Nov. 14, 2011, and claims priority benefit of Australian Patent Application No. 2010101247, filed Nov. 12, 2010. These applications are incorporated by reference herein in full.

TECHNICAL FIELD OF THE INVENTION

This invention concerns ratchet pruners for use inter alia in gardening. The invention is applicable to pruners known as secateurs worked by one hand and to loppers with extended handles which require two handed operation.

BACKGROUND OF THE INVENTION

Ratchet pruners are a boon to gardeners, especially female gardeners, because they do not require a strong grip to sever stalks close to the opening capacity of the pruners. The repeated squeezing action of the operator's hand allows the cut to be made in three or four stages. While thick stalks or dried stalks all yield to the blade using multiple ratchet strokes, the time taken to prune by this ratchet mechanism is considerably greater and progress is slower.

Carrying an ordinary pruner and a ratchet pruner does not generally speed the operator's work because it may not be until the resistance to cutting is felt by the operator that the choice of which tool to use becomes apparent.

SUMMARY OF THE INVENTION

In one aspect the invention provides a dual mode ratchet pruner which in a first mode closes a blade with a single squeeze by an operator and in a second mode requires multiple squeezes by the operator to close the blade, wherein the position of a mode selection control selects which of said first and second modes the pruner would operate in.

Preferably:
the pruner has two handles for manual scissor-like actuation,
the blade has:
  a blade pivot whereby the blade is pivotally connected to a first of said handles, and
  a rocker arm with ratchet teeth extending away from the pivot;
the second of said handles is pivotally connected to said first handle distant from said blade pivot; and
a pawl activated by scissor action of the handles is able to apply force to those of the teeth nearest the blade pivot or those furthest from the blade pivot.

Preferably the pawl is a radius arm pivoted to said second handle and said pawl is biased to operate in said first mode.

Preferably the ratchet is formed by a window in the rocker arm and the pawl is free to apply force to a first end of the window to produce said first mode and to the opposite end of the window to produce said second mode.

Preferably said mode selection control comprises a cam which acts on the pawl. More preferably
said mode selection control comprises a shaft portion having a cam cross section, and
said shaft is rotatable by a lever on one of said handles to thereby select which of said modes the pruner would operate in.

BRIEF DESCRIPTION OF THE DRAWINGS

The invention is now described with reference to the accompanying drawings, in which.

DETAILED DESCRIPTION OF EMBODIMENTS

Figure 1:
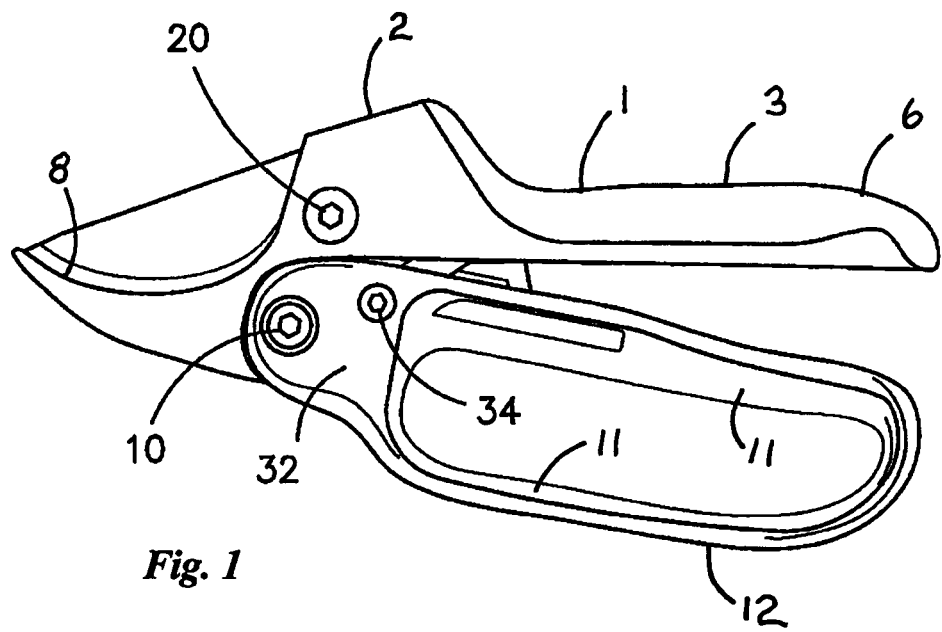
FIG. 1 is a side view of a pruner according to one embodiment of the invention, shown in the closed position.
Figure 2:
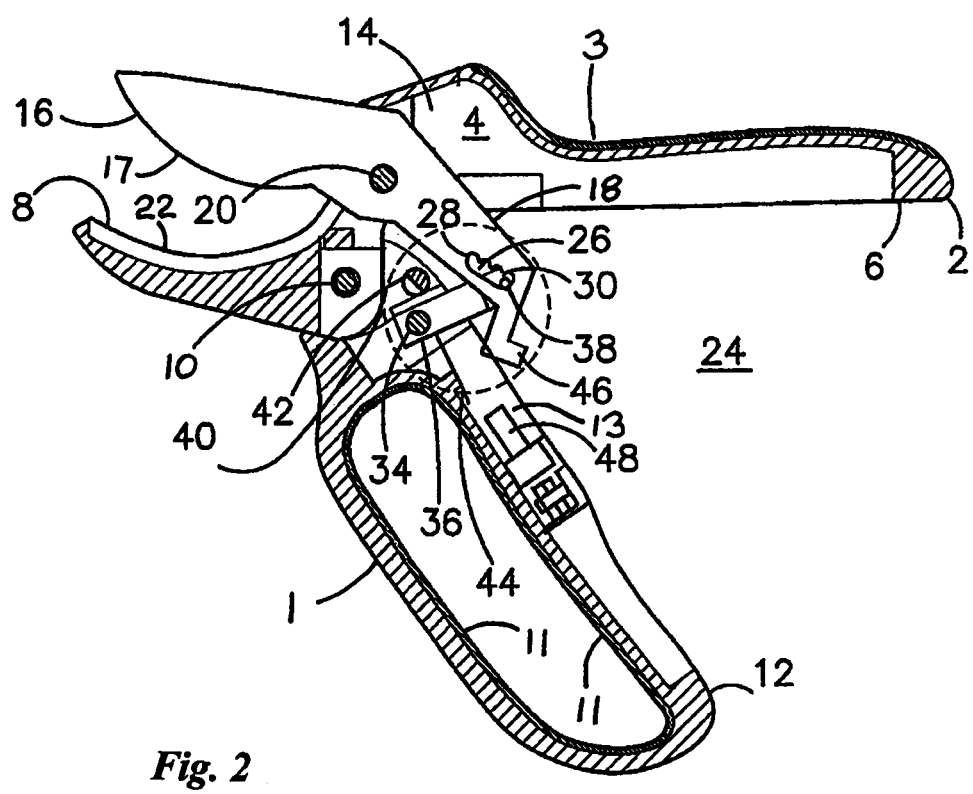
FIG. 2 is a side section view of the pruner of FIG. 1 open and ready to cut in the multistage cut mode.
Figure 3:
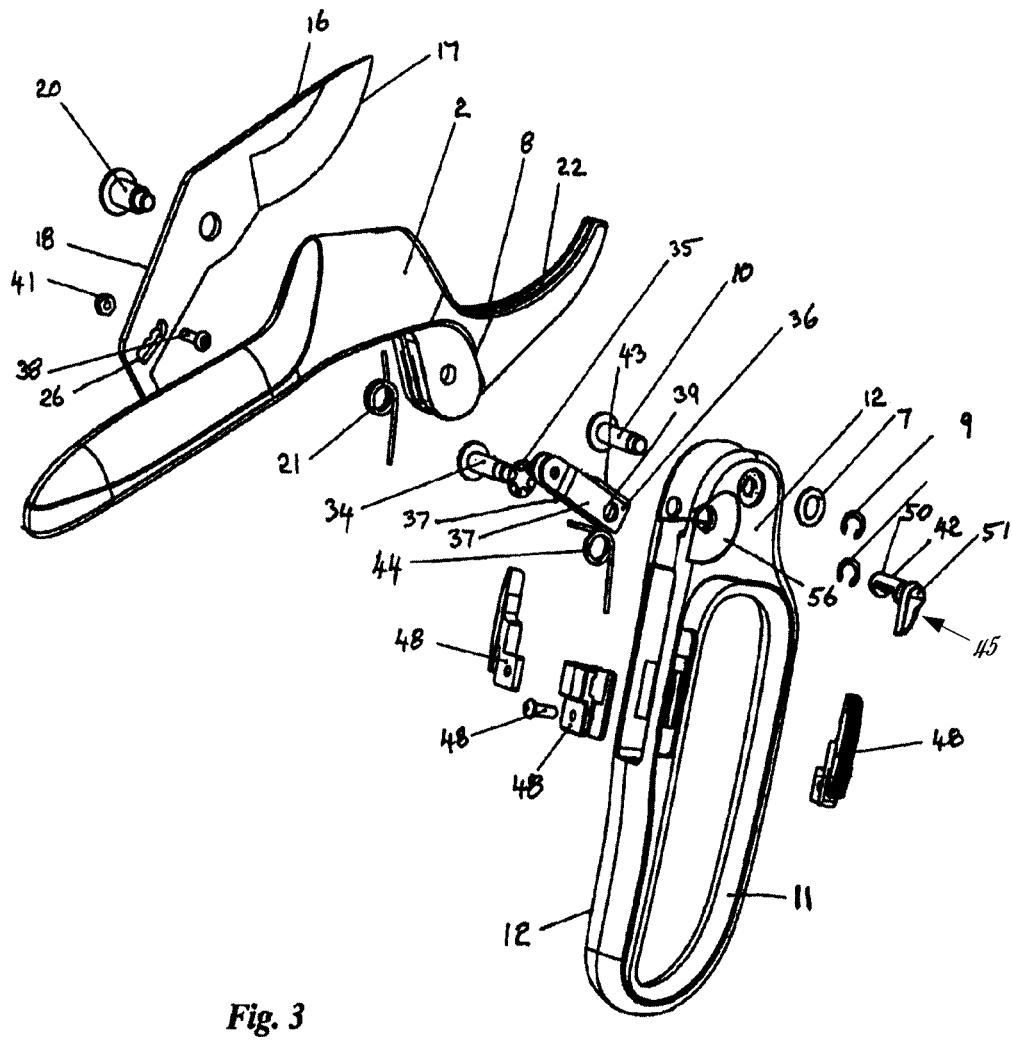
FIG. 3 is an exploded view of the pruner in FIG. 1.
Figure 4:
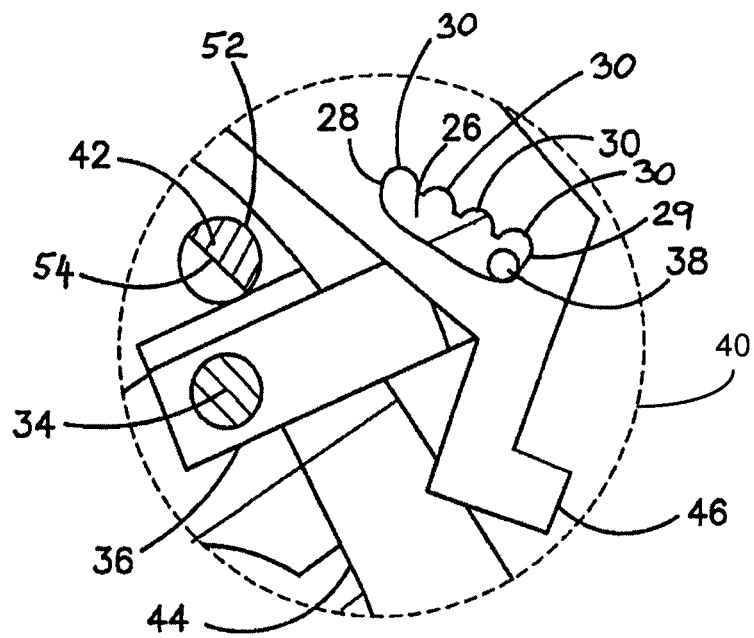
FIG. 4 is an enlarged view of the mode selection area of the pruner with the parts set in its, multistage cut mode.
Figure 5:
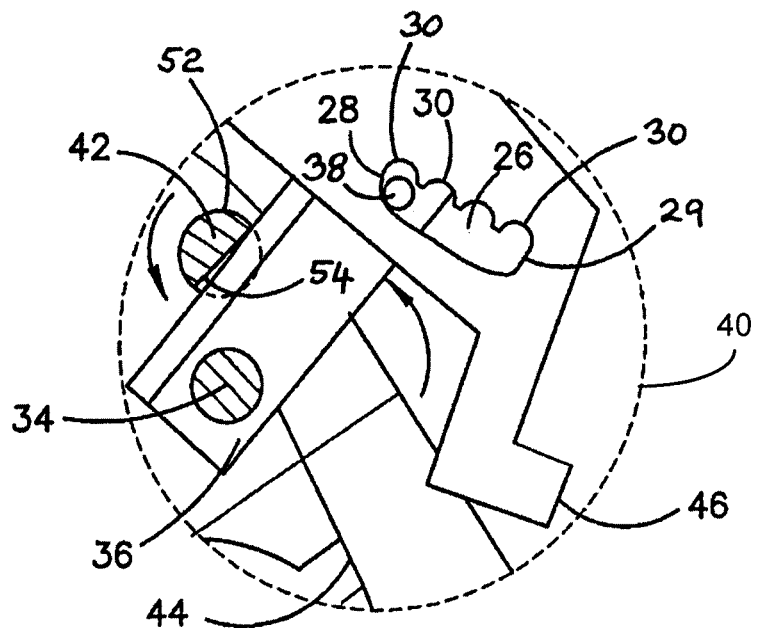
FIG. 5 is the view shown in FIG. 4 but with the parts set in the pruner's single cut mode.

In this description the pruner will be described oriented for use as shown in FIG. 1 to with its cutting blade uppermost and pointing forwards. The region encircled by dashed lines and indicated at 40 in FIG. 2 is shown in respective enlarged views in FIG. 4 and FIG. 5.

As shown in the drawings, the pruner 1 has a handle 2 having a hollow mid section 4 which extends into a grip 6 at one end and jaw member in the form of a curved anvil 8 at the opposite end. The handle 2 is formed mostly of die cast aluminium with an engineering grade plastic material 3 forming a gripping portion which provides thermal insulation for the user's hand. At the base of the anvil 8 at the front of the handle 2 is a pivot 10 which joins the handle 2 to a die cast scissor-type handle which forms the lower guard handle 12 of the pruner. The handle 12 has a hollow portion 13 at its front end and the gripping area 11 is of plastic material which provides thermal insulation. The pivot 10 is a flat-headed pin fastened by a washer 7 and a circlip 9.

The hollow midsection 4 of the handle 2 has a slot 14 which accommodates a blade 16 having a cutting edge 17 towards one end and a rocker arm 18 towards the other end. The blade 16 is mounted on a pivot pin 20 which bridges the slot 14 and screws into the right hand side of the handle 2. A rat-trap-type spring 21 around the pivot pin 20 biases the handles to open the pruner. The cutting edge 17 of the blade 16 bears onto a narrow bed 22 of hard polymer material inset into the working face of the anvil 8. The rocker arm 18 extends into a V-shaped space 24 lying between handles 2 and 12.

The endmost zone of the rocker arm 18 is perforated to create a ratchet window 26 having rounded ends 28 and 29 and four ratchet teeth 30.

The upper part of the scissor handle 12 is hollow and the opposing walls 32 are joined by a thrust pin 34. The thrust pin 34 acts as a pivot for a bifurcated thrust link 36 and is retained by a lock washer 35. The thrust link has a pair of cranked side plates 37 having, at one end, respective bores 39 to accommodate the thrust pin 34 and, at the other end, a pawl pin 38 connecting the side plates 37. The pawl pin 38 projects through the ratchet window 26 and is retained by a nut 41 on its threaded end. The opposing walls 32 of the handle 12 also support a mode selector 45 which has a cam 42 lying between the walls 32 and contacting a planar web portion 43 on the thrust link 36 which joins the top edges of the side plates 37. A rat-trap-type spring 44 is coiled around the thrust pin 34 with one tail of the spring bearing against the underside of the web portion 43 and the other tail of the spring bearing against the base of the hollow portion 13. The spring 44 urges the bifurcated thrust link 36 into contact with the cam 42 at all times and biases the ratchet into the single cut mode at one end of the window.

The cam 42 has a shaft portion 50 having a cylindrical face portion 52 and a longitudinal flat face portion 54. Engagement of the flat face portion 54 with the web portion 43 allows the pawl pin 38 to reach the end 28 of the window 26 which lies closer to the blade 16. When the selector 45 is rotated so that the cylindrical face portion 52 is in engagement with the web portion 43 of the thrust link, this has the effect of moving the pin 38 to the end 29 of the window further from the blade, wherein the pin 38 is free to engage the ratchet teeth 30 and yield a multistage cut in the general manner of a conventional ratchet pruner.

The shaft 50 carries a lever 51 at one end which lies within a sector-shaped depression 56 on the outside face of the handle 12. When the lever is rotated between its extremes within the depression 56, the shaft 50 rotates between its positions where it is the flat face 54 or the cylindrical portion 52 which bears against the thrust link.

The end of the rocker arm 18 has a hook 46 which is captured by sliding a latch mechanism 48 on the scissor handle so that the pruner can be closed and kept closed.

Whilst the above description includes the preferred embodiment of the invention, it is to be understood that many variations, alterations, modifications and/or additions may be introduced into the constructions and arrangements of parts previously described without departing from the essential features or the spirit or ambit of the invention.

For example although the pruners described with reference to FIGS. 1 to 5 are anvil-style pruners, the invention is also applicable to bypass-style pruners.

It will be also understood that where the word "comprise", and variations such as "comprises" and "comprising", are used in this specification, unless the context requires otherwise such use is intended to imply the inclusion of a stated feature or to features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A dual mode cutting tool including a first handle having a hand grip and a jaw member, a cutting member pivotally coupled to the first handle intermediate the hand grip and jaw member, and a second handle pivotally coupled to the first handle, wherein the cutting member has a blade arranged for engagement with the jaw member and a rocker arm with a plurality of ratchet teeth extending away from the cutting member pivot, further including a pawl linkage coupled from the second handle to an operative engagement with the ratchet teeth of the rocker arm and a mode selector movably supported by the second handle wherein a user engages and moves the mode selector between a first and second mode position and when the selector is in either of the mode positions, the selector acts upon the linkage to control a position of engagement of the linkage with the ratchet teeth when the tool is operated by manipulation of the handles.

2. A dual mode cutting tool according to claim 1 wherein: when the mode selector is in the first mode position, the pawl linkage is forced in the position of engagement to apply force to those of the ratchet teeth nearest the cutting member pivot, to define a first single action cutting mode, and when in the second mode position, the pawl linkage is forced in the position of engagement to apply force to those of the ratchet teeth furthest from the cutting member pivot, to define a second ratchet action cutting mode.

3. A dual mode cutting tool according to claim 2 further including a spring acting between the pawl linkage and said second handle to bias said pawl linkage into contact with the mode selector.

4. A dual mode cutting tool according to claim 2 wherein said mode selector includes a cam which bears against the pawl linkage to effect said control thereof in accordance with the first or second mode position configuration of the selector.

5. A dual mode cutting tool according to claim 4 wherein: said mode selector comprises a shaft portion pivotally supported by said second handle and having a cross section shaped to provide said cam, and a user operable lever portion for rotating said shaft portion between said first and second mode positions.

6. A dual mode cutting tool according to claim 2 wherein the linkage comprises a pawl pin, the pawl pin of the linkage engaging the closest to the cutting member pivot ratchet teeth when the selector is in the first mode position and the pawl pin engaging the furthest from the cutting member pivot ratchet teeth when the selector is in the second mode position.

7. A dual mode cutting tool according to claim 1 wherein the rocker arm has a ratchet window that forms said ratchet teeth and the pawl linkage includes a pawl pin that projects through said ratchet window for engagement between the pawl linkage and the ratchet teeth of the rocker arm.

8. A dual mode cutting tool according to claim 1 wherein the engagement between the blade and jaw member is an anvil-style cutting engagement.

9. A dual mode ratchet pruner including a first handle having a hand grip and a jaw member, a cutting member pivotally coupled to the first handle intermediate the hand grip and jaw member, and a second handle pivotally coupled to the first handle, wherein the cutting member has a blade arranged for engagement with the jaw member and a rocker arm formed with a ratchet window having ratchet teeth extending away from the cutting member pivot, the second handle movably supporting a mode selector and a pawl linkage coupling the second handle to the ratchet window of the rocker arm, the mode selector is engaged and moved by a user to a first mode configuration where the selector acts on the pawl linkage to bias the pawl linkage toward an end of the ratchet window closest the blade to engage respective ones of the ratchet teeth to define a single-action cutting mode and the mode selector is engaged and moved by the user to a second mode configuration where the selector acts on the pawl linkage to bias the pawl linkage toward an end of the ratchet window furthest from the blade to engage respective ones of the ratchet teeth to define a ratchet-action cutting mode.

10. A dual mode ratchet pruner according to claim 9 wherein the engagement between the blade and jaw member is an anvil-style cutting engagement.

11. A dual mode ratchet pruner according to claim 8 wherein the second handle is pivotally connected to said first handle distant from said blade pivot and the pawl linkage includes a pawl pin that projects through said ratchet window and is arranged to, in the first mode selector configuration, apply force to those of the ratchet teeth nearest the blade pivot and, in the second mode selector configuration, apply force to those ratchet teeth furthest from the blade pivot, when the tool is operated by manipulation of the handles.

12. A dual mode ratchet pruner according to claim 9 wherein the mode selector comprises a cam that is rotatably supported between walls of the second handle and arranged to bear against the pawl linkage, and a spring acting between the pawl linkage and second handle for biasing the pawl linkage into contact with the cam.

13. A dual mode ratchet pruner according to claim 12 wherein the cam has a flat portion which allows the pawl linkage under bias of the spring to reach the end of the ratchet window closest to the blade when the mode selector cam is in the first mode configuration.

14. A dual mode cutting tool including a first handle having a hand grip and a jaw member, a cutting member pivotally coupled to the first handle intermediate the hand grip and jaw member, and a second handle pivotally coupled to the first handle, wherein the cutting member has a blade arranged for engagement with the jaw member and a rocker arm with a plurality of ratchet teeth extending away from the cutting member pivot, further including a pawl linkage coupled from the second handle to an operative engagement with the ratchet teeth of the rocker arm, a mode selector movably supported on the second handle, and a spring acting between the pawl linkage and said second handle to bias said pawl linkage into contact with the mode selector wherein the mode selector acts upon the linkage to control a position of engagement of the linkage with the ratchet teeth when the tool is operated by manipulation of the handles.

* * * * *